(12) United States Patent
Hoang

(10) Patent No.: US 10,119,615 B2
(45) Date of Patent: Nov. 6, 2018

(54) SEALING COMPONENTS AND METHODS OF MANUFACTURE

(71) Applicant: Cameron International Corporation, Houston, TX (US)

(72) Inventor: Loc Gia Hoang, Houston, TX (US)

(73) Assignee: Cameron International Corporation, Houston, TX (US)

( * ) Notice: Subject to any disclaimer, the term of this patent is extended or adjusted under 35 U.S.C. 154(b) by 28 days.

(21) Appl. No.: 15/169,180

(22) Filed: May 31, 2016

(65) Prior Publication Data

US 2017/0343108 A1   Nov. 30, 2017

(51) Int. Cl.

| F16J 15/08 | (2006.01) |
|---|---|
| F16K 3/02 | (2006.01) |
| F16J 15/3236 | (2016.01) |
| F16J 15/328 | (2016.01) |
| E21B 33/03 | (2006.01) |
| E21B 34/02 | (2006.01) |
| E21B 33/00 | (2006.01) |

(52) U.S. Cl.
CPC ......... F16J 15/0887 (2013.01); F16J 15/328 (2013.01); F16J 15/3236 (2013.01); F16K 3/0281 (2013.01); E21B 33/03 (2013.01); E21B 34/02 (2013.01); E21B 2033/005 (2013.01)

(58) Field of Classification Search
CPC .......... F16J 15/0887; F16J 15/38; F16J 15/08; F16K 3/0281; E21B 33/03; E21B 34/02; E21B 2033/005
See application file for complete search history.

(56) References Cited

U.S. PATENT DOCUMENTS

| 3,378,269 A | 4/1968 | Castor | |
|---|---|---|---|
| 4,658,847 A * | 4/1987 | McCrone | E06B 5/164 137/72 |
| 8,814,175 B2 * | 8/2014 | Tohdoh | F16J 15/0887 277/644 |
| 2005/0242571 A1 * | 11/2005 | Houghton | F16J 15/025 285/110 |
| 2010/0007097 A1 | 1/2010 | Sundararajan | |
| 2013/0187343 A1 | 7/2013 | Tohdoh | |

(Continued)

FOREIGN PATENT DOCUMENTS

WO   2015030960 A1   3/2015

OTHER PUBLICATIONS

Sealing Technology, Surface Systems, 2011, Cameron, 16 pages.
PCT International Search Report & Written Opinion for PCT Application No. PCT/US2017/034699 dated Aug. 16, 2017.

*Primary Examiner* — Gilbert Y Lee
(74) *Attorney, Agent, or Firm* — Fletcher Yoder, P.C.

(57) ABSTRACT

A method of manufacturing a sealing component includes defining a configuration for the sealing component, wherein the configuration comprises a cross-section comprising a first wall and a second wall joined by a turning wall to form a generally U-shape, the first wall and the second wall comprising a variable cross-sectional thickness, wherein the cross-section is taken along a plane extending along an axial axis of the sealing component and the cross-section extends in a circumferential direction. The method also includes depositing a powder into a chamber, applying an energy source to the deposited powder, and consolidating the powder into a layer according to the defined configuration.

20 Claims, 7 Drawing Sheets

(56) References Cited

U.S. PATENT DOCUMENTS

2013/0193650 A1* 8/2013 Tohdoh ................... F16J 15/08
                                                    277/590
2016/0047262 A1   2/2016 Cernay

* cited by examiner

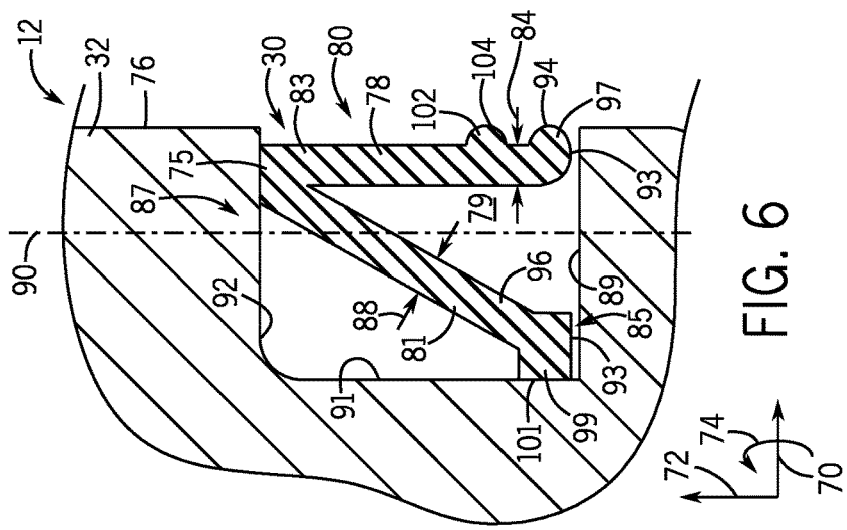
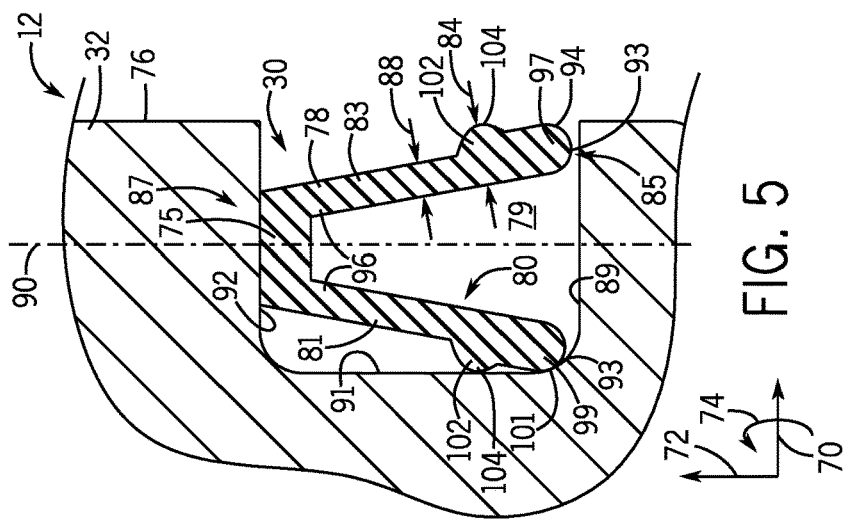
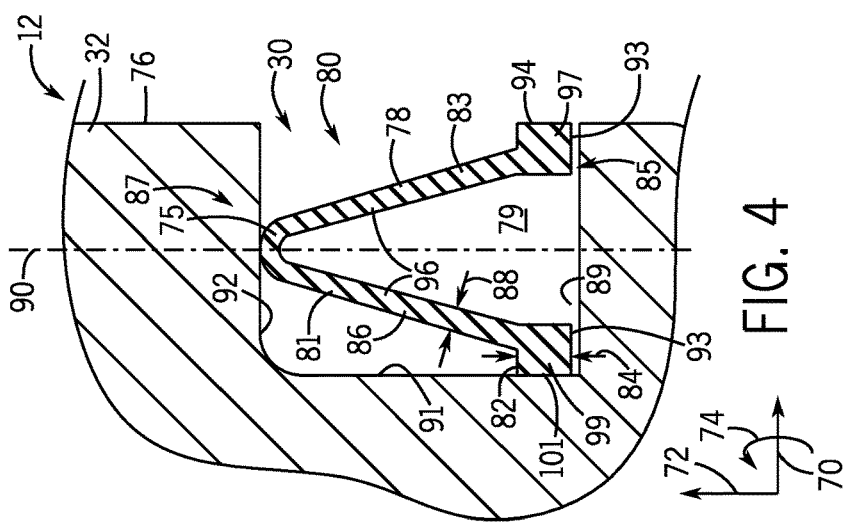

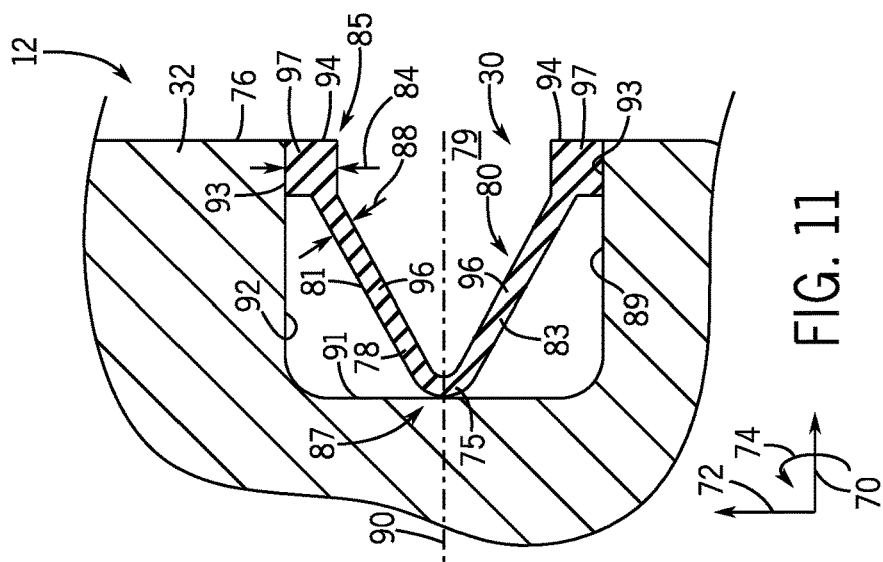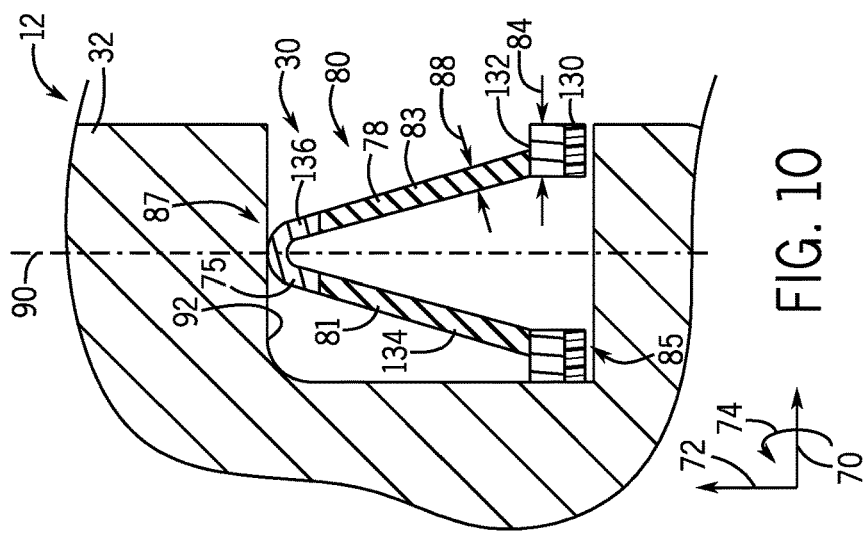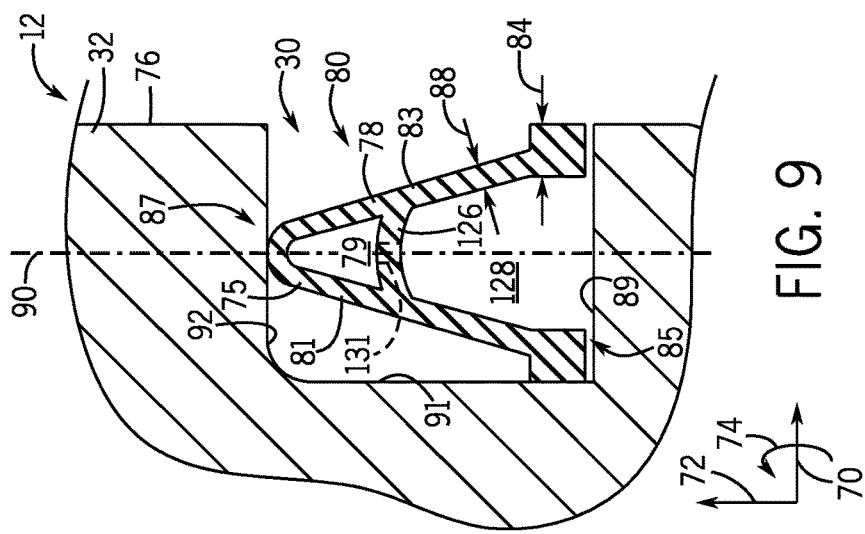

ns and Methods of Manufacture

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

In certain systems, such as mineral extraction systems, sealing rings (e.g., annular sealing rings) may be used to seal various components of the system and/or to block a flow of fluid into certain portions of the system. The configuration of these sealing rings can impact their sealing ability. Therefore, it would be desirable to improve the configuration of such sealing rings.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 4 is a cross-sectional side view of a sealing ring disposed within a seal groove, in accordance with an embodiment of the present disclosure;

FIG. 5 is a cross-sectional side view of a sealing ring disposed within a seal groove, in accordance with another embodiment of the present disclosure;

FIG. 6 is a cross-sectional side view of an asymmetrical sealing ring disposed within a seal groove, in accordance with another embodiment of the present disclosure;

FIG. 9 is a cross-sectional side view of a sealing ring disposed within a seal groove, in accordance with another embodiment of the present disclosure;

FIG. 10 is a cross-sectional side view of a sealing ring disposed within a seal groove, in accordance with another embodiment of the present disclosure;

FIG. 11 is a cross-sectional side view of a sealing ring disposed within a seal groove with an alternative orientation, in accordance with an embodiment of the present disclosure.

DETAILED DESCRIPTION OF SPECIFIC EMBODIMENTS

Figure 1:
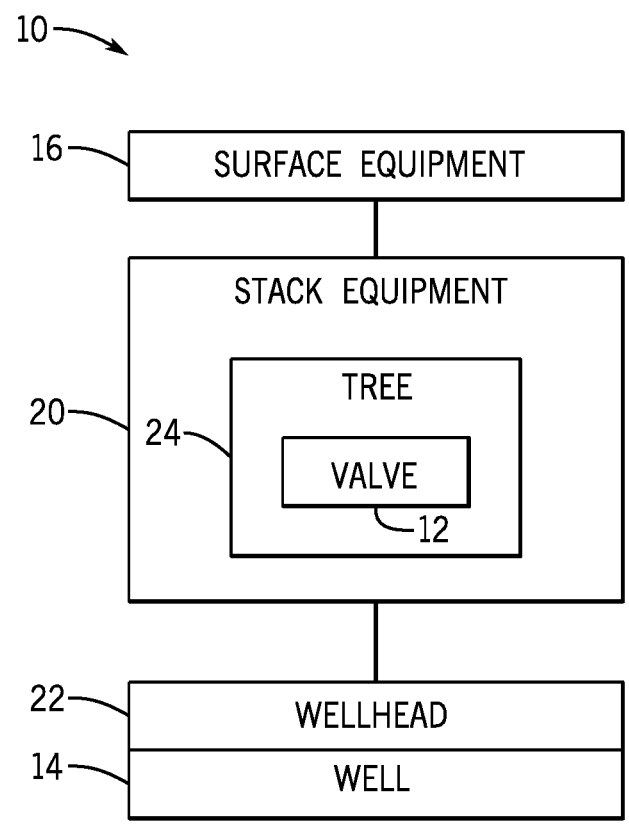
FIG. 1 is a block diagram of a mineral extraction system, in accordance with an embodiment of the present disclosure.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain systems, such as mineral extraction systems (i.e., drilling and production systems), may include various sealing components. For example, some gate valves may include seats (e.g., annular seats) having grooves (e.g., annular grooves) that support sealing rings (e.g., annular sealing rings) to block a flow of fluid about the gate valve. Such sealing rings may be formed by machining or molding a sheet (e.g., metal sheet) of a uniform thickness. Accordingly, such sealing rings may have a uniform cross-sectional thickness. For example, some sealing rings may be formed by molding (e.g., folding or shaping) a metal sheet to form a C-shaped cross-section with a uniform cross-sectional thickness. Unfortunately, sealing rings with these structural features may have limited sealing ability and/or may cause undesirable stress and/or wear on the sealing rings and/or associated components.

Therefore, the present disclosure relates generally to embodiments of seals (e.g., sealing rings) having variable cross-sectional thickness. The variable cross-sectional thickness may extend along a length of the seal or about a circumference of the sealing ring. In certain embodiments, the sealing rings may form a loop (e.g., circular, square, rectangular, or the like) and may be used to form a seal in components of any of a variety of systems (e.g., ball valves, gate valves, choke valves, or check valves of a mineral extraction system or any other system). The structural features disclosed herein (e.g., variable cross-sectional thickness and/or various complex cross-sectional shapes) may affect a stiffness of the sealing ring, deflections of the sealing ring, and/or contact locations and forces between the sealing ring and the associated components (e.g., a seal groove, a valve body, or the like) to provide adequate or desirable sealing. In some cases, the structural features disclosed herein may result in relatively low stress and/or wear on the sealing ring and/or the associated components and/or extend the useful life of the sealing ring and/or the associated components.

The sealing rings disclosed herein may be formed from a hard, corrosion resistant material, such as metals, metal alloys, ceramics, ceramic metals (i.e., cermets), or any combination thereof, for example. In certain embodiments, the sealing rings may be formed from cobalt-based alloys and/or cobalt-chromium alloys, tungsten carbide, stainless steel, carbides, nitrides, or other material designed for corrosion resistance and/or wear resistance. Moreover, the sealing ring may include cobalt, nickel, iron, aluminum, boron, carbon, chromium, manganese, molybdenum, phosphorus, sulfur, silicon, titanium, or any combination thereof.

In certain embodiments, the sealing rings may be manufactured via additive manufacturing techniques. Such techniques may enable construction of the complex sealing rings having a variable cross-sectional thickness from computer models, without difficult machining steps. In general, additive manufacturing techniques involve applying a source of energy, such as a laser or electron beam, to deposited powder layers in order to grow a part having a particular shape and features. To facilitate discussion, certain embodiments relate to mineral extraction systems and sealing rings that may be used in gate valves of mineral extraction systems. However, it should be understood that the sealing rings may be adapted for use in any of a variety of fluid-handling components or systems (e.g., ball valves, gate valves, choke valves, or check valves of a mineral extraction system or any other system).

With the foregoing in mind, FIG. 1 illustrates an embodiment of a mineral extraction system 10 having a gate valve 12. In the illustrated embodiment, the system 10 is configured to facilitate the extraction of a resource, such as oil or natural gas, from a well 14. As shown, the system 10 includes a variety of equipment, such as surface equipment 16 and stack equipment 20, for extracting the resource from the well 14 via a wellhead 22. The surface equipment 16 may include a variety of devices and systems, such as pumps, conduits, valves, power supplies, cable and hose reels, control units, a diverter, a gimbal, a spider, and the like. As shown, the stack equipment 20 includes a production tree 24, also commonly referred to as a "Christmas tree." The tree 24 may include components that control the flow of an extracted resource out of the well 14 and upward toward the surface equipment 16 and/or that control the flow of injected fluids into the well 14. In some embodiments, the tree 24 may include various conduits, flow meters, sensors, and valves, such as the gate valve 12. As discussed in more detail below, various components of the mineral extraction system 10 may include sealing rings. For example, the gate valve 12 may include sealing rings to block a flow of fluid about the gate valve 12. While the gate valve 12 is shown within the tree 24 in FIG. 1, it should be understood that the gate valve 12 disclosed herein may be used in any portion of the system 10, such as the surface equipment 16, the stack equipment 20, and/or the wellhead 22, for example.

Figure 2:
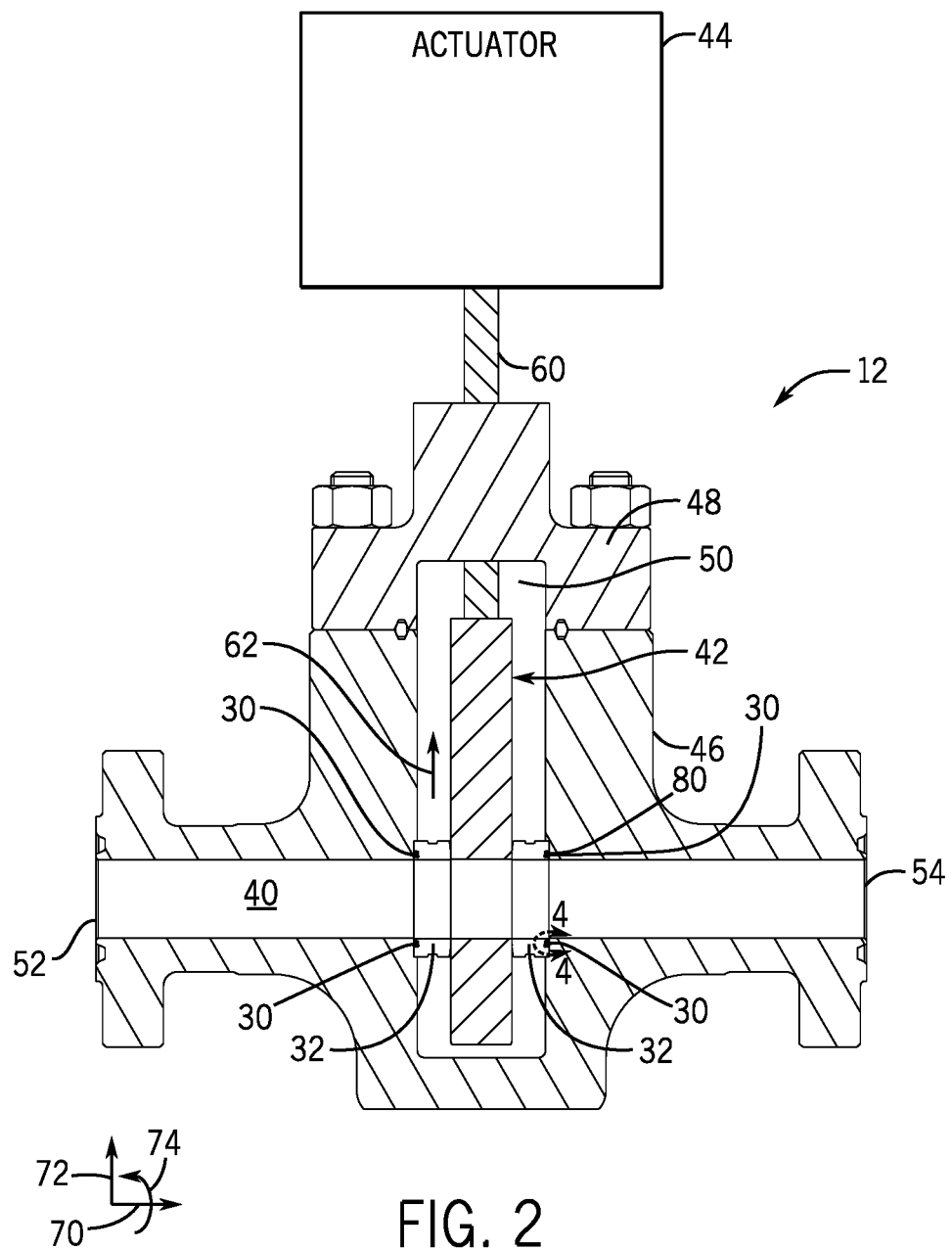
FIG. 2 is a cross-sectional side view of a gate valve having sealing rings supported in seal grooves of seats, in accordance with an embodiment of the present disclosure.

FIG. 2 is a cross-sectional side view of the gate valve 12 having seal grooves 30 (e.g., annular grooves) formed in seats 32 (e.g., annular seats). The gate valve 12 is generally configured to control a flow of fluid in various applications. The gate valve 12 has a bore 40 that may be sized for the given application. For example, the bore 40 of the gate valve 12 may be at least approximately 4 centimeters (cm) in diameter. In other embodiments, the bore 40 of the gate valve 12 may be less than approximately 12 cm. In certain embodiments, the gate valve 12 is configured to operate at a high pressure of at least approximately 10, 100, or 200 Megapascals (MPa). In some embodiments, the gate valve 12 is configured to operate at pressure lower than approximately 10, 100, 200, or 300 MPa or between approximately 0.5 and 10, 0.5 and 100, 0.5 and 200, or 0.5 and 300 MPa.

In the illustrated embodiment, the gate valve 12 includes an actuator 44. The actuator 44 may include a spring, a hydraulic piston, a manually actuated mechanism (e.g., hand wheel), or other actuation system (e.g., spring-biased actuator, electrical actuator, magnetic actuator, or any combination thereof). The actuator 44 may be coupled to a top portion of a valve body 46 via a bonnet 48, or the actuator 44 may be directly coupled to the valve body 46. The gate valve 12 includes a gate 42 (or valve member) disposed within a cavity 50 of the valve body 46. As will be appreciated, the actuator 44 applies a force to a stem 60 coupling the gate 42 to the actuator 44. In this manner, the gate 42 moves between an illustrated open position and a closed position within the cavity 50 as shown by arrow 62. The valve body 46 of the gate valve 12 includes an inlet 52 and an outlet 54 configured to support a flow of a fluid through the bore 40 of the valve body 46 of the gate valve 12. The valve body 46 may be constructed of cast iron, ductile iron, cast carbon steel, gun metal, stainless steel, alloy steels, corrosion resistant alloys, and/or forged steels.

As shown, each seat 32 is disposed between the valve body 46 and the gate 42. More specifically, one seat 32 is disposed on an upstream side of the gate 42, and another seat 32 is disposed on a downstream side of the gate 42. Each seat 32 includes one or more seal grooves 30 configured to support a sealing ring 80 (e.g., an annular sealing ring or a loop, such as a loop having a circular, square, or rectangular shape) disposed between the valve body 46 and the seat 32. In the illustrated embodiment, the sealing ring 80, the seal groove 30, and the seat 32 extend circumferentially about the bore 40. As discussed in more detail below, in the disclosed embodiments, the sealing ring 80 may have any of a variety of cross-sectional shapes and may have a variable cross-sectional thickness. The variable cross-sectional thickness may impart desirable stiffness characteristics to particular portions of the sealing ring 80. Additionally or alternatively, the variable cross-sectional thickness of the sealing ring 80 may positively affect deflections of the sealing ring 80, stress on the sealing ring 80, contact locations and/or forces between the sealing ring 80 and the seal groove 30 and/or the valve body 46, wear on the sealing ring 80, the seat 32, and/or the valve body 46, and/or the sealing ability of the sealing ring 80, for example. To facilitate discussion, the sealing ring 80, the seal groove 30, the seat 32, and/or other components of the gate valve 12 may be described with reference to an axial axis or direction 70, a radial axis or direction 72, and a circumferential axis or direction 74.

Figure 3:
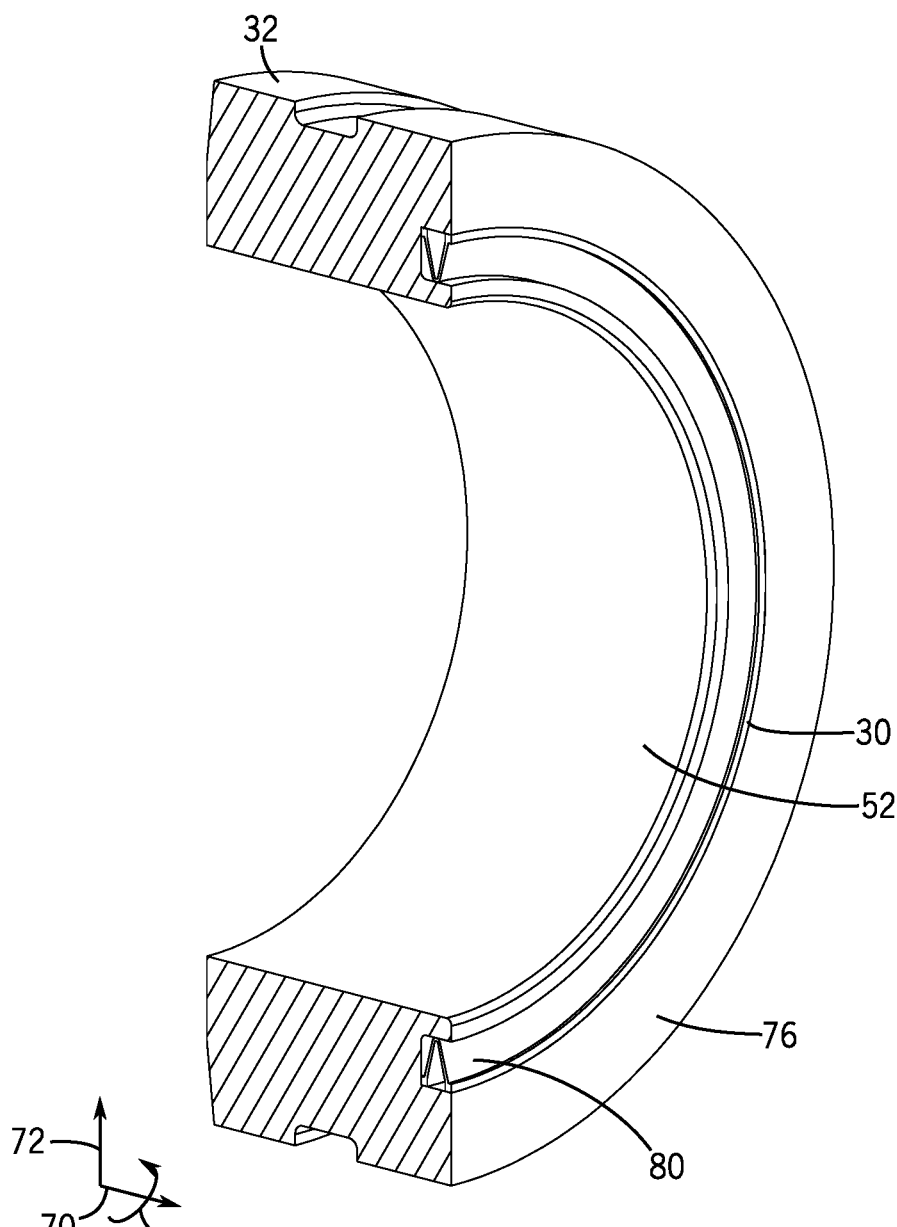
FIG. 3 is a perspective view of a sealing ring supported in a seal groove of a seat of the gate valve of FIG. 2, in accordance with an embodiment of the present disclosure.

FIG. 3 is a partial cutaway perspective view of the sealing ring 80 supported in the seal groove 30 of the seat 32 of the gate valve 12. As shown, the seal groove 30 is formed in a surface 76 (e.g., annular surface or axially-facing surface) of the seat 32 and extends circumferentially about the seat 32. In the illustrated embodiment, the sealing ring 80 is positioned within the seal groove 30 to enable the sealing ring 80 to contact the valve body 46 and to form a seal with the valve body 46 during operation of the gate valve 12.

FIG. 4 is a cross-sectional side view of a portion of the sealing ring 80 taken within line 4-4 of FIG. 2. In the illustrated embodiment, the sealing ring 80 is supported within the seal groove 30 of the seat 32 of the gate valve 12, and the sealing ring 80 includes a body 78 (e.g., annular or continuous loop of any shape, such as annular, rectangular, or the like) that extends in the circumferential direction 74. The body 78 has a first radially-extending portion 81 (e.g., a first wall) and a second radially-extending portion 83 (e.g., a second wall). The first portion 81 and the second portion 83 of the body 78 form a generally U-shaped cross-section that extends along the radial axis 72 from a first end 85 (e.g., first radial side or radially-outer side) that is proximate to a radially-outer recess surface 89 of the seat 32 to a second end 87 (e.g., second radial side or radially-inner side) that is proximate to a radially-inner recess surface 92 of the seal groove 30. The first portion 81 and the second portion 83 converge toward one another from the first end 85 to the second end 87 and are joined at the second end 87 by a turning portion 75 (e.g., axially-extending portion or turning wall) that turns about an intermediate space 79. As shown, the first portion 81 and the second portion 83 are separated along the axial axis 70 by the intermediate space 79 (e.g., gap) that extends in the circumferential direction 74. In the illustrated embodiment, the intermediate space 79 may be open to the first end 85 (e.g., empty, open, or hollow from the turning portion 75 to the first end 85), although in other embodiments the intermediate space 79 may be filled and/or additional elements or features may be positioned within the intermediate space 79 between the turning portion 75 and the second end 87. As discussed in more detail below, fluid may flow into the intermediate space 79 (e.g., between the sealing ring 80 and the seal groove 30), thereby exerting forces on the first portion 81 and the second portion 83 to drive these portions 81, 83 away from one another (e.g., along the axial axis 70) to facilitate formation of the seal. The illustrated U-shaped cross-section is taken in a plane extending between the first end 85 and the first end 85 of the body 78 and the U-shaped cross-section extends in a circumferential direction 74. As shown, the U-shaped cross-section opens toward the first end 85. It should be understood that the seal 80 of FIG. 4, or any of the seals 80 described herein, may have a U-shaped cross-section that opens toward the second end 87 and/or the first portion 81 and the second portion 83 may converge toward one another from the second end 87 to the first end 85 and may be joined at the first end 85 by a turning portion 75 (e.g., axially-extending portion or turning wall) that turns about an intermediate space 79.

As shown, the sealing ring 80 has a variable cross-sectional thickness (e.g., in a cross-section taken along a plane extending between the first end 85 and the second end 87). For example, a first cross-sectional thickness 84 (e.g., at a first portion 82 of the sealing ring 80) and a second cross-sectional thickness 88 (e.g., at a second portion 86 of the sealing ring 80) are different from one another. In some embodiments, the first cross-sectional thickness 84 may vary from the second cross-sectional thickness 88 by approximately 3, 5, 8, 10, 15, 20, 25, 30, 35, 40, 45, or 50 percent or more. In some embodiments, the first cross-sectional thickness 84 may vary from the second cross-sectional thickness 88 by more than 1, 2, 3, 4, 5, 6, 7, 8, 9, 10, 15, 20, 25, 30, 35, 40, 45, 50 percent or more. In some embodiments, the first cross-sectional thickness 84 may vary from the second cross-sectional thickness 88 by about 3 to 50, 5 to 30, 8 to 25, or 10 to 20 percent. In some embodiments, at least one of the first cross-sectional thickness 84 or the second cross-sectional thickness 88 may be equal to or less than 0.3, 0.35, 0.4, 0.45, 0.5, 0.55, 0.6, 0.7, 0.8, 0.9, or 1 cm. In some embodiments, at least one of the first cross-sectional thickness 84 or the second cross-sectional thickness 88 may be between about 0.3 to 1, 0.35 to 0.8, 0.4 to 0.6 cm. The cross-sectional thickness (e.g., cross-sectional thicknesses 84, 88) may be a distance or thickness measured within a plane orthogonal to the respective opposed surfaces of the sealing ring 80, as shown, and/or along the radial axis 72 and/or along the axial axis 70, for example.

In the illustrated embodiment, the cross-sectional shape of the sealing ring 80 is generally symmetrical about a center line 90. In the illustrated embodiment, the second portion 83 includes a sealing portion 97 (e.g., annular sealing portion) on the first side 85 of the sealing ring 80. The sealing portion 97 may have a groove-facing surface 93 (e.g., radially-facing surface or radially-outer surface) configured to contact and/or to face the radially-outer recess surface 89 of the seal groove 30. The sealing portion 97 also includes a sealing surface 94 (e.g., axially-facing surface) configured to contact and/or to seal against another component, such as the valve body 46 of the gate valve 12 to block a flow of fluid from the bore 40 about the gate valve 12. In the illustrated embodiment, the groove-facing surface 93 and the sealing surface 94 of the sealing portion 97 are generally flat and orthogonal to one another. As shown, the first portion 81 includes a groove-contacting portion 99 (e.g., annular portion) on the first side 85 of the sealing ring 80. The groove-contacting portion 99 includes a respective groove-facing surface 93 (e.g., radially-facing surface or radially-outer surface) configured to contact and/or to face the radially-outer recess surface 89 of the seal groove 30. The groove-contacting portion 99 also includes a groove contacting surface 101 (e.g., axially-facing surface) configured to contact and/or to seal against the axially-facing recessed surface 91 of the seal groove 30. During operation, fluid may flow between the groove-facing surface 93 of the sealing portion 97 and the seal groove 30 into the intermediate space 79. The fluid pressure in the intermediate space 79 may drive the first portion 81 and the second portion 83 away from one another (e.g., along the axial axis 70), thereby causing and/or enabling the groove-contacting surface 101 of the groove-contacting portion 99 to contact and to seal against the axially-facing recessed surface 91 of the seal groove 30 and the sealing surface 94 of the sealing portion 97 to contact and to seal against another component, such as the valve body 46 of the gate valve 12 to block a flow of fluid from the bore 40 about the gate valve 12. In the illustrated embodiment, the groove-facing surface 93 and the groove contacting surface 101 of the groove-contacting portion 99 are generally flat and orthogonal to one another. As shown, each of the first portion 81 and the second portion 83 also include respective angled portions 96 (e.g., annular walls) that extend from the groove-contacting portion 99 and the sealing portion 97, respectively, and converge toward one another along the radial axis 72. The angled portions 96 are joined together at the second end 87 of the sealing ring 80, which is configured to be positioned adjacent to the radially-inner recess surface 92 of the seal groove 30.

FIG. 5 is a cross-sectional side view of another embodiment of the sealing ring 80 taken within line 4-4 of FIG. 2. The sealing ring 80 includes a variable cross-sectional thickness (e.g., having the first cross-sectional thickness 84 and the second cross-sectional thickness 88 that are different from one another and/or having any of the variable thickness features discussed above with respect to FIG. 4). As shown, the sealing ring 80 is supported within the seal groove 30 of the seat 32 of the gate valve 12. The sealing ring 80 includes the body 78 that extends in the circumferential direction 74. The body 78 has the first portion 81 and the second portion 83 joined by the turning wall 75 and separated by the intermediate space 79. The body 78 has a generally U-shaped cross-section that extends along the radial axis 72 from the first side 85 of the sealing ring 80 that is proximate to the radially-outer recess surface 89 of the seat 32 to the second side 87 of the sealing ring 80 that is proximate to the radially-inner recess surface 92 of the seal groove 30. The U-shaped cross-section extends in a circumferential direction 74. In the illustrated embodiment, the cross-sectional shape of the sealing ring 80 is generally symmetrical about the center line 90.

The second portion 83 includes a sealing portion 97 at the first side 85 of the sealing ring 80. The sealing portion 97 has the groove-facing surface 93 configured to contact and/or to face the radially-outer recess surface 89 of the seal groove 30. The sealing portion 97 also includes the sealing surface 94 configured to contact the valve body 46 of the gate valve 12 to block a flow of fluid from the bore 40 about the gate valve 12. In the illustrated embodiment, the groove-facing surface 93 and the sealing surface 94 of the sealing portion 97 are generally curved (e.g., have a curved cross-sectional shape). As shown, the first portion 81 includes a groove-contacting portion 99 (e.g., annular portion) on the first side 85 of the sealing ring 80. The groove-contacting portion 99 includes a respective groove-facing surface 93 (e.g., radially-facing surface or radially-outer surface) configured to contact and/or to face the radially-outer recess surface 89 of the seal groove 30. The groove-contacting portion 99 also includes another groove contacting surface 101 (e.g., axially-facing surface) configured to contact the axially-facing recessed surface 91 of the seal groove 30. In the illustrated embodiment, the groove-facing surface 93 and the groove contacting surface 101 of the groove-contacting portion 99 are generally curved (e.g., have a curved cross-sectional shape). As shown, each of the first portion 81 and the second portion 83 also include respective angled portions 96 that extend from the groove-contacting portion 99 and the sealing portion 97, respectively, and converge toward one another along the radial axis 72. The angled portions 96 are joined together at the second end 87 of the sealing ring 80, which is configured to be positioned adjacent to the radially-inner recess surface 92 of the seal groove 30.

In the illustrated embodiment, the sealing ring 80 includes additional ridges 102 (e.g., annular ridges) that extend axially away from the body 78. In certain embodiments, the ridges 102 may contact the axially-facing recessed surface 91 of the seal groove 30 and/or another component, such as the valve body 46 of the gate valve 12, to form a seal. In some embodiments, 1, 2, 3, 4, 5, 6 or more ridges 102 may extend axially outward from the body 78. The illustrated ridges have a curved contacting surface 104 (e.g., a curved cross-sectional shape), although the ridges 102 may have any suitable cross-sectional shape and may be positioned at any suitable axial or radial location about the sealing ring 80.

FIG. 6 is a cross-sectional side view of another embodiment of the sealing ring 80 taken within line 4-4 of FIG. 2. The sealing ring 80 includes a variable cross-sectional thickness (e.g., having the first cross-sectional thickness 84 and the second cross-sectional thickness 88 that are different from one another and/or having any of the variable thickness features discussed above with respect to FIG. 4). As shown, the sealing ring 80 is supported within the seal groove 30 of the seat 32 of the gate valve 12. The sealing ring 80 includes the body 78 that extends in the circumferential direction 74. The body 78 has the first portion 81 and the second portion 83 joined by the turning wall 75 and separated by the intermediate space 79. The body 78 has a generally U-shaped cross-section that extends along the radial axis 72 from the first side 85 of the sealing ring 80 that is proximate to the radially-outer recess surface 89 of the seal groove 30 to the second side 87 of the sealing ring 80 that is proximate to the radially-inner recess surface 92 of the seal groove 30. The U-shaped cross-section extends in a circumferential direction 74. In the illustrated embodiment, the cross-sectional shape of the sealing ring 80 is asymmetrical about the center line 90.

The second portion 83 includes a sealing portion 97 at the first side 85 of the sealing ring 80. The sealing portion 97 has the groove-facing surface 93 configured to contact and/or to face the radially-outer recess surface 89 of the seal groove 30. The sealing portion 97 also includes the sealing surface 94 configured to contact the valve body 46 of the gate valve 12 to block a flow of fluid from the bore 40 about the gate valve 12. In the illustrated embodiment, the groove-facing surface 93 and the sealing surface 94 of the sealing portion 97 of the second wall 83 are generally curved (e.g., have a curved cross-sectional shape). As shown, the first portion 81 includes a groove-contacting portion 99 (e.g., annular portion) on the first side 85 of the sealing ring 80. The groove-contacting portion 99 includes a respective groove-facing surface 93 (e.g., radially-facing surface or radially-outer surface) configured to contact and/or to face the radially-outer recess surface 89 of the seal groove 30. The groove-contacting portion 99 also includes another groove-contacting surface 101 (e.g., axially-facing surface) configured to contact the axially-facing recessed surface 91 of the seal groove 30. In the illustrated embodiment, the groove-facing surface 93 and the groove-contacting surface 101 of the groove-contacting portion 99 are generally flat and orthogonal to one another. The first wall 81 includes an angled portion 96 that extends from the groove-contacting portion 99 and converges toward the second portion 83 along the radial axis 72. The angled portion 96 joins the second portion 83 at the second end 87 of the sealing ring 80, which is configured to be positioned adjacent to the radially-inner recess surface 92 of the seal groove 30.

In the illustrated embodiment, the second portion 83 of the sealing ring 80 includes a ridge 102 that extends axially away from the body 78 to contact another component, such as the valve body 46 of the gate valve 12. As noted above, in some embodiments, 1, 2, 3, 4, 5, 6 or more ridges 102 may extend axially from the body 78 to contact the valve body 46 of the gate valve 12. The illustrated ridge 102 has a curved contacting surface 104 (e.g., a curved cross-sectional shape), although the ridge 102 may have any suitable cross-sectional shape and may be positioned at any suitable axial or radial location about the sealing ring 80. It should be understood that in certain alternate embodiments, the illustrated cross-section may be rotated about the center line 90 such that the first portion 81 having the angled portion 96 is configured to contact the valve body 46 of the gate valve 12 and the second portion 83 extends radially proximate to the axially-facing recessed surface 91 of the seal groove 30.

FIGS. 7-10 illustrate cross-sectional side views of other embodiments of the sealing ring 80 taken within line 4-4 of FIG. 2. As shown in FIGS. 7-10, the sealing ring 80 includes a variable cross-sectional thickness (e.g., having the first cross-sectional thickness 84 and the second cross-sectional thickness 88 that are different from one another and/or having any of the variable thickness features discussed above with respect to FIG. 4). As shown, the sealing ring 80 is supported within the seal groove 30 of the seat 32 of the gate valve 12. The sealing ring 80 includes the body 78 that extends in the circumferential direction 74. The body 78 has the first portion 81 and the second portion 83 joined by the turning wall 75 and separated by the intermediate space 79. The body 78 has a generally U-shaped cross-section that extends along the radial axis 72 from the first side 85 of the sealing ring 80 that is proximate to the radially-outer recess surface 89 of the seal groove 30 to the second side 87 of the sealing ring 80 that is proximate to the radially-inner recess surface 92 of the seal groove 30. The U-shaped cross-section extends in a circumferential direction 74.

Figure 7:
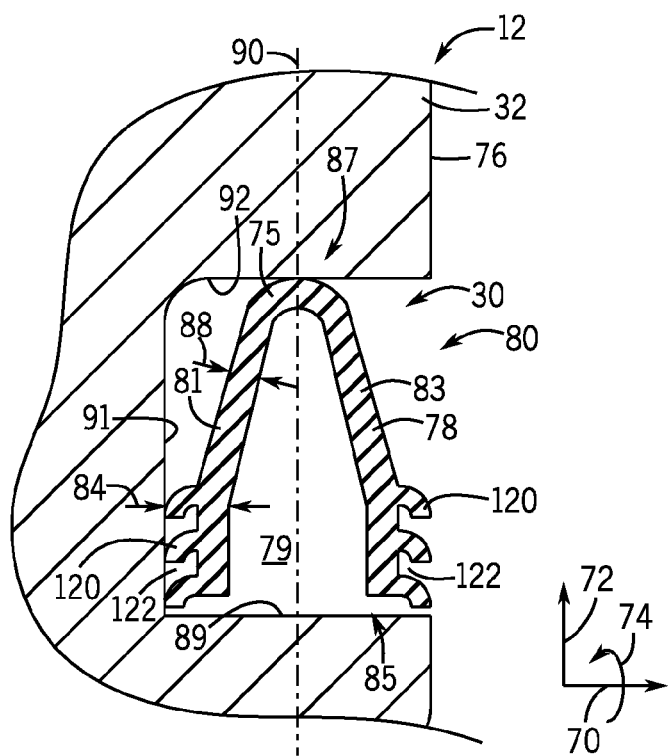
FIG. 7 is a cross-sectional side view of a sealing ring disposed within a seal groove, in accordance with another embodiment of the present disclosure.
Figure 8:
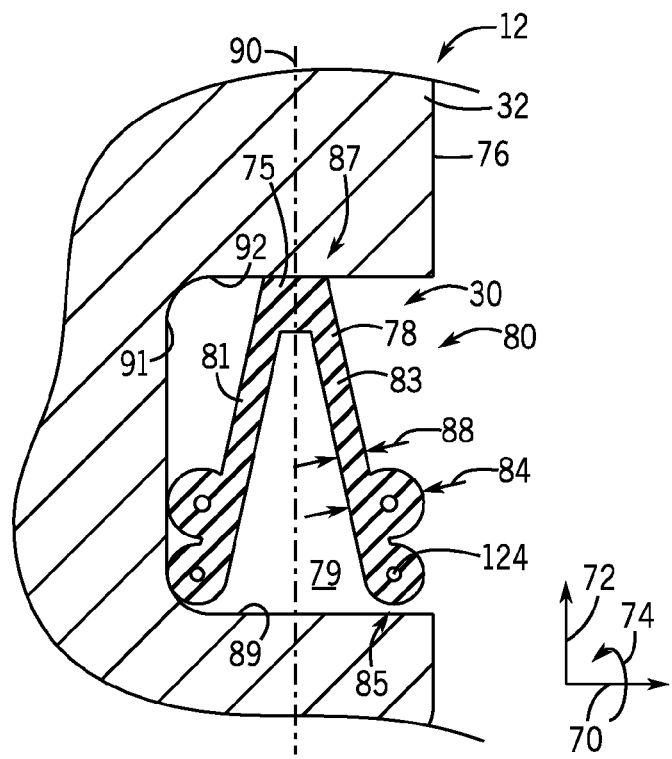
FIG. 8 is a cross-sectional side view of a sealing ring disposed within a seal groove, in accordance with another embodiment of the present disclosure.

As shown in FIG. 7, the sealing rings 80 disclosed herein may include complex protrusions 120 and/or recesses 122. For example, in the illustrated embodiment, protrusions 120 extend from the first portion 81 and the second portion 83 of the body 78 to contact the axially-facing recessed surface 91 of the seal groove 30 and/or to contact another component, such as the valve body 46 of the gate valve 12, to form a seal. As shown in FIG. 8, the sealing rings 80 disclosed herein may include interior cavities 124. For example, in the illustrated embodiments, multiple interior cavities 124 are positioned in the first portion 81 and the second portion 83. The interior cavities 124 may extend in the circumferential direction 74 about all or a portion of the sealing ring 80. In some embodiments, the interior cavities 124 may be surrounded by the body 78 (e.g., not accessible or visible from outside the body 78). In some embodiments, the interior cavities 124 may be hollow, although in other embodiments the interior cavities 124 may be filled (e.g., with an elastic material). As shown in FIG. 9, the sealing rings 80 disclosed herein may include additional features extending between the first portion 81 and the second portion 83. For example, in the illustrated embodiment, an intermediate wall 126 extends axially between the first portion 81 and the second portion 83 across the intermediate space 179. The intermediate wall 126 may extend in the circumferential direction about all or a portion of the sealing ring 80. Thus, in some embodiments, the intermediate space 79 may not be open to the first side 85 of the sealing ring 80, but rather be defined between the turning wall 75 and the intermediate wall 126. In some such cases, the intermediate wall 126 may be positioned such that an outer space 128 between the first portion 81 and the second portion 83 is open to the first end 85 of the sealing ring 80. In some embodiments, the intermediate wall 126 includes one or more openings 131 to enable fluid to flow across the intermediate wall 126 into the intermediate space 79. The openings 131 may be positioned at discrete locations about the circumference of the sealing ring 80. Additionally or alternatively, the sealing rings 80 disclosed herein may include discrete layers of at least two different materials, as shown in FIG. 10. In the illustrated embodiment, the sealing ring 80 includes a first layer 130, a second layer 132, a third layer 134, and a fourth layer 136. These layers may include two or more different materials. For example, the first layer 130 may comprise a first material that is relatively soft, harder, more elastic, less elastic, more wear resistant, and/or less wear resistant than a second, different material of the second layer 130. Although the layers are layered along the radial axis 72, it should be understood that the layers may alternatively be layered along the axial axis 70. Furthermore, although four layers are shown, any suitable number (e.g., 1, 2, 3, 4, 5, or more) layers of one or more materials may be provided. In some embodiments, a material composition of the sealing ring 80 may change gradually (e.g., a percent by mass of one material relative to a second material may change) across the sealing ring 80 (e.g., between the first end 85 and the second end 87).

FIGS. 4-10 are merely provided as examples of sealing rings 80 having a variable cross-sectional thickness. Furthermore, any of the features described with respect to FIGS. 4-10 may be combined in any suitable manner to form the seal. In certain embodiments, the sealing ring 80 disclosed herein may be a gaplessly continuous one-piece (e.g., single material) sealing ring 80 that is configured to extend between two components to form a seal between the two components. In certain embodiments, the sealing ring 80 may be positioned within a groove or a recess, such as the groove 30 of the seat 32, that supports the sealing ring 80, or the sealing ring 80 may be mounted to a surface (e.g., a radially outer surface or a radially inner surface) of a component or otherwise extend between two components to form a seal. It should be understood that sealing rings 80 having any of a variety of cross-sectional shapes with variable cross-sectional thickness may be constructed for use in the groove 30 of the seat 32 of the gate valve 12 of the mineral extraction system 10, in other portions of the gate valve 12 (e.g., about the gate 44, between the gate 44 and the valve body 46 or the bonnet 48, or the like) or in any other suitable fluid-handling component or system. For example, the sealing rings 80 disclosed herein may be used at any suitable portion of the wellhead (e.g., about a casing, about a hanger, between a casing and a hanger), a blowout preventer (BOP), a piston and cylinder system, or the like. In some embodiments, the sealing ring 80 may have a different orientation within the seal groove 30. An example of an alternative orientation that may be used in the gate valve 12, other valves, the wellhead, the BOP, or other components of the mineral extraction system 10 is illustrated in FIG. 11. In the illustrated embodiment, the first portion 81 is a radially-inner portion 81 (e.g., a radially-inner wall) and the second portion 83 is a radially-outer portion (e.g., radially-outer wall). The first portion 81 and the second portion 83 form a generally U-shaped cross-section that extends along the axial axis 70 from the first end 85 (e.g., first axial side) that is proximate to the axially-facing surface 76 of the seat 32 to a second end 87 (e.g., second axial side) that is proximate to the axially-facing recessed surface 91 of the seal groove 30. In the illustrated embodiment, the first portion 81 and the second portion 83 converge toward one another from the first end 85 to the second end 87 and are joined at the second end 87 by the turning portion 75 (e.g., radially-extending portion or turning wall) that turns about the intermediate space 79. As shown, the first portion 81 and the second portion 83 are separated along the radial axis 72 by the intermediate space 79 (e.g., gap) that extends in the circumferential direction 74. The illustrated U-shaped cross-section is taken in a plane extending between the first end 85 and the second end 87 of the body 78 and the U-shaped cross-section extends in a circumferential direction 74.

In the embodiment of FIG. 11, each of the first portion 81 and the second portion 83 include respective sealing portions 97 at the first side 85 of the sealing ring 80. Each of the sealing portions 97 has the groove-facing surface 93 configured to contact respective surfaces 89, 92 of the seal groove 30. Each of the sealing portions 97 also includes the sealing surface 94 configured to contact another component, such as the valve body 46 of the gate valve 12, to block a flow of fluid. In the illustrated embodiment, the groove-facing surface 93 and the sealing surface 94 of each sealing portion 97 are generally flat and orthogonal to one another. As shown, each of the first portion 81 and the second portion 83 also include respective angled portions 96 that extend from respective sealing portions 97 and converge toward one another along the axial axis 70. The angled portions 96 are joined together at the second end 87 of the sealing ring 80, which is configured to be positioned adjacent to the axially-facing recessed surface 91 of the seal groove 30.

The sealing ring 80 of FIG. 11 includes a variable cross-sectional thickness (e.g., having the first cross-sectional thickness 84 and the second cross-sectional thickness 88 that are different from one another and/or having any of the variable thickness features discussed above with respect to FIGS. 4 to 10). Any of the sealing rings 80 described herein, such as the sealing rings 80 illustrated in FIGS. 4-10, may be oriented within the sealing groove 30 in the manner shown in FIG. 11.

The features of the illustrated sealing ring 80 (e.g., the cross-sectional shape and/or the variable cross-sectional thickness) may impart desirable stiffness characteristics to particular portions of the sealing ring 80. Additionally or alternatively, the variable cross-sectional thickness of the sealing ring 80 may positively affect deflections of the sealing ring 80, stress on the sealing ring 80, contact locations and/or forces between the sealing ring 80 and the seal groove 30 and/or the valve body 46, wear on the sealing ring 80, the seat 32, and/or the valve body 46, and/or the sealing ability of the sealing ring 80, for example.

As noted above, additive manufacturing techniques generally enable construction of custom parts having complex geometries, curvatures, and features, such as the sealing rings 80 discussed herein. Accordingly, additive manufacturing may be used to construct sealing rings 80 having a variety of shapes and features, such as a variable cross-sectional thickness and/or the illustrated cross-sectional shapes, which are impractical or cannot be made using conventional techniques, such as machining or molding a sheet (e.g., metal sheet).

Figure 12:
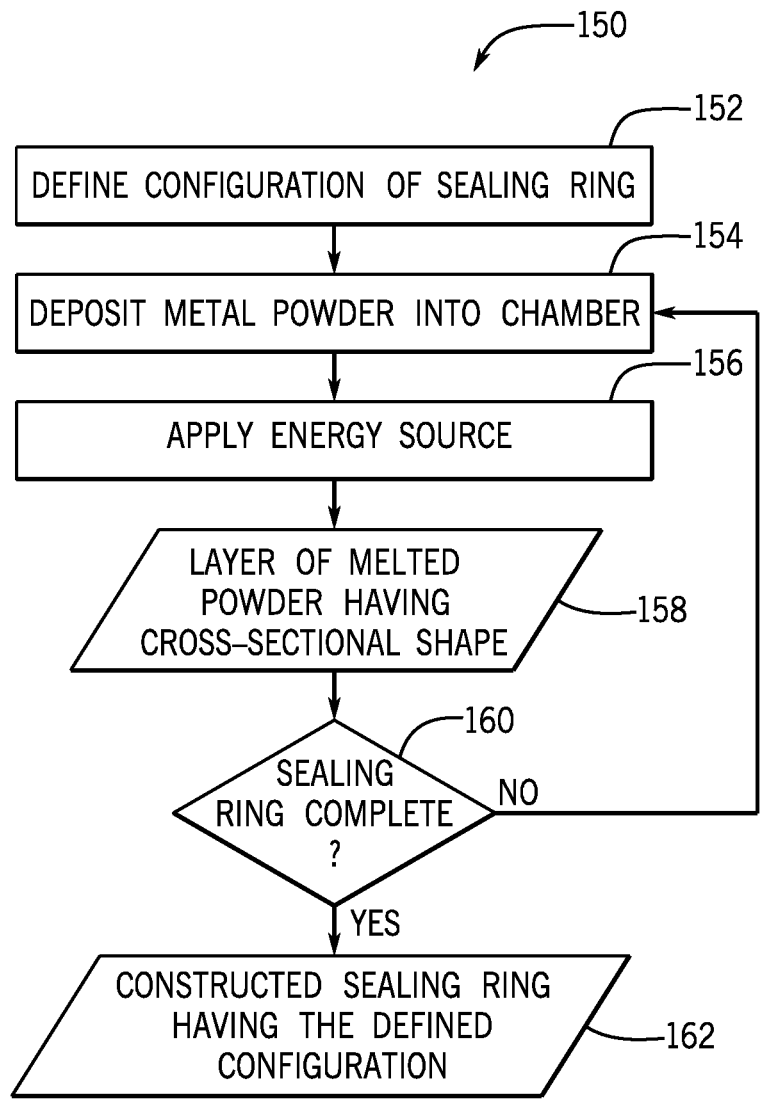
FIG. 12 is a flow diagram of a method of manufacturing a sealing ring via an additive manufacturing process, in accordance with an embodiment of the present disclosure.

Additive manufacturing may be particularly useful in the construction of the sealing ring 80 for use the mineral extraction system 10 (e.g., for use in the gate valve 12 of the mineral extraction system 10) as the sealing ring 80 may be constructed from high-strength materials that may be difficult to machine or mold using other methods. In addition, additive manufacturing techniques provide the capability to construct complex solid objects from computer models, without difficult machining steps. In general, additive manufacturing techniques involve applying a source of heat, such as a laser or electron beam, to deposited powder layers (e.g., layer after layer) in order to grow a part having a particular shape. With the foregoing in mind, FIG. 12 is a flow diagram of a method 150 for constructing the sealing ring 80 having a variable cross-sectional thickness. The method 150 includes steps for constructing the sealing ring 80 using an additive manufacturing process.

The method 150 may be performed by an additive manufacturing system, which may include a controller (e.g., electronic controller), a processor, a memory device, a user interface, and/or an energy source. The method 150 includes defining a particular configuration or shape for the sealing ring 80, in step 152. The configuration may be programmed by an operator into an additive manufacturing system by using a specialized or general purpose computer having the processor, for example. The defined configuration may have a variable cross-sectional thickness, including any of the cross-sectional shapes and/or variable cross-sectional thicknesses described above.

In step 154, a layer of powder (e.g., a metal powder or other suitable powder) is deposited into a chamber, such as a vacuum chamber. Any of a variety of materials may be used in any suitable combination to form the sealing ring 80, including those described in detail above. Furthermore, different materials may be used to form the sealing ring 80 with discrete layers of various materials and material properties. In step 156, an energy source, such a laser or electron beam, for example, is applied to the deposited layer of powder. In step 158, the laser or electron beam melts or otherwise consolidates the powder into a consolidated layer having a cross-sectional shape corresponding to the configuration defined in step 152. The processor or operator may determine whether the sealing ring 80 is incomplete or complete, in step 160. If the part is incomplete, then steps 154 and 156 are repeated to produce layers of consolidated powder having cross-sectional shapes corresponding to the defined confirmation or model until construction of the sealing ring 80 is complete. Thus, the energy source is applied to melt or otherwise consolidate each newly deposited powder layer until the final product is complete and the sealing ring 80 having the defined configuration with the variable cross-sectional thickness is produced, as shown in step 162.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method of manufacturing a sealing ring configured to form a seal between a first component and a second component, the method comprising:
   defining a configuration for a body of the sealing component that is configured to be positioned within a corresponding groove of the first component and to contact the second component to form the seal, wherein the configuration comprises a continuous loop, a radially-inner side, a radially-outer side, a cross-section comprising a turning wall that joins respective ends of a first wall and a second wall to form a generally U-shape, the cross-section comprising a variable cross-sectional thickness, wherein the cross-section extends in a circumferential direction and is taken along a plane extending between the radially-inner side and the radially-outer side, and wherein the first wall and the second wall are separated along an axis by an intermediate gap that extends in the circumferential direction, and an intermediate wall extends between the first wall and the second wall across the intermediate gap;
   depositing a powder into a chamber;
   applying an energy source to the deposited powder;
   consolidating the powder into a layer according to the defined configuration; and
   repeating the depositing, applying, and consolidating steps to construct the sealing component having the defined configuration.

2. The method of claim 1, wherein the powder comprises a metal powder or a metal alloy powder.

3. A sealing ring configured to form a seal between a first component and a second component, comprising:
   a body comprising a continuous loop and configured to be positioned within a corresponding groove of the first component and to contact the second component to form the seal, wherein the body comprises:
      a radially-inner side;
      a radially-outer side; and
      a cross-section comprising a generally U-shape and a variable thickness, wherein the cross-section extends in a circumferential direction and is taken along a plane extending between the radially-inner side and the radially-outer side;
      wherein the body comprises a first wall and a second wall that form respective arms of the U-shape, the body comprises a turning wall that joins respective ends of the first wall and the second wall to form the U-shape, the first wall and the second wall are separated along an axis by an intermediate gap that extends in the circumferential direction, and an intermediate wall extends between the first wall and the second wall across the intermediate gap.

4. The sealing ring of claim 3, wherein the cross-section comprises a first cross-sectional thickness and a second cross-sectional thickness that vary from one another by more than about 5 percent.

5. The sealing ring of claim 3, wherein the cross-section comprises a first portion having a first cross-sectional thickness of less than 1 centimeter.

6. The sealing ring of claim 3, wherein the first wall and the second wall converge toward one another between the radially-inner side and the radially-outer side of the body.

7. The sealing ring of claim 3, wherein a contacting surface of the second wall of the body is configured to contact the second component to form the seal, and wherein the contacting surface has a curved cross-sectional shape.

8. The sealing ring of claim 7, wherein the first wall comprises a groove-facing surface that is configured to face a radially-facing recessed surface of the corresponding groove of the first component and a groove-contacting surface that is configured to contact and seal against an axially-facing recessed surface of the corresponding groove, and the groove-facing surface and the groove-contacting surface are flat surfaces that are orthogonal to one another.

9. The sealing ring of claim 3, wherein the cross-section is asymmetrical about a center line extending between the radially-inner side and the radially-outer side of the body.

10. The sealing ring of claim 3, wherein the body comprises a metal or a metal alloy material.

11. The sealing ring of claim 3, wherein the intermediate wall comprises openings to enable fluid flow across the intermediate wall into a space defined at least in part by the intermediate wall and the turning wall.

12. A sealing component, comprising:
a first annular component of a mineral extraction system;
a second annular component of the mineral extraction system positioned adjacent to the first annular component, wherein the second annular component comprises an annular groove extending circumferentially about the second annular component; and
a sealing ring positioned within the annular groove to form a seal between the first annular component and the second annular component, wherein the sealing ring comprises a cross-section comprising a variable thickness, extending in a circumferential direction, and having a first wall and a second wall joined together by a turning wall at a first side of the sealing ring and separated from one another along an axis by an intermediate space that is open to a second side of the sealing ring, wherein the cross-section is asymmetrical about a center line that extends in a direction orthogonal to the axis.

13. The sealing component of claim 12, wherein the annular groove is formed in a flat, axially-facing surface of the second annular component.

14. The sealing component of claim 12, wherein the cross-section comprises a first cross-sectional thickness of less than 1 centimeter, and the first cross-sectional thickness and a second cross-sectional thickness vary from one another by more than about 5 percent.

15. The sealing component of claim 12, wherein the first wall and the second wall form a generally U-shaped cross-section.

16. The sealing component of claim 12, wherein a contacting surface of the sealing ring is configured to contact the first annular component to form the seal, and wherein the contacting surface has a curved cross-sectional shape.

17. The sealing component of claim 12, wherein the sealing ring comprises a metal or a metal alloy material.

18. The sealing component of claim 12, wherein at least one of the first wall or the second well comprises interior cavities that extend in the circumferential direction.

19. The sealing component of claim 18, wherein the interior cavities are filled with an elastic material.

20. The sealing component of claim 12, wherein the sealing ring comprises discrete layers of at least two different materials.

* * * * *